United States Patent
Pott et al.

(10) Patent No.: US 7,419,020 B2
(45) Date of Patent: Sep. 2, 2008

(54) ELECTRICAL ENERGY SYSTEM IN A HYBRID CAR

(75) Inventors: Ekkehard Pott, Gifhorn (DE); Matthias Holz, Lehre (DE); Michael Zillmer, Sickte (DE); Marc Hladun, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 458 days.

(21) Appl. No.: 11/125,466

(22) Filed: May 10, 2005

(65) Prior Publication Data

US 2005/0279544 A1  Dec. 22, 2005

(30) Foreign Application Priority Data

May 10, 2004  (DE)  ........................ 10 2004 023 619

(51) Int. Cl.
*B60K 1/04* (2006.01)
(52) U.S. Cl. .................. 180/65.1; 180/65.2; 903/903; 903/907; 903/943; 320/117
(58) Field of Classification Search ............... 180/65.1, 180/65.2, 65.3; 903/903, 907, 943; 320/117, 320/122, 126; 318/139
See application file for complete search history.

(56) References Cited

U.S. PATENT DOCUMENTS

| | | | | |
|---|---|---|---|---|
| 5,563,479 A | * | 10/1996 | Suzuki | 318/139 |
| 6,109,237 A | | 8/2000 | Pels et al. | 123/339.19 |
| 6,262,561 B1 | * | 7/2001 | Takahashi et al. | 320/104 |
| 6,936,934 B2 | | 8/2005 | Morimoto et al. | 307/9.1 |
| 6,972,159 B2 | * | 12/2005 | Autenrieth et al. | 429/7 |
| 7,075,194 B2 | * | 7/2006 | Weidenheimer et al. | 307/71 |
| 2006/0137918 A1 | * | 6/2006 | Dinser et al. | 180/65.1 |
| 2006/0249318 A1 | * | 11/2006 | Weidenheimer et al. | 180/65.2 |

FOREIGN PATENT DOCUMENTS

| | | |
|---|---|---|
| DE | 19639904 A1 | 5/1997 |
| DE | 19704153 C2 | 10/2000 |
| DE | 10205555 A1 | 10/2002 |

* cited by examiner

*Primary Examiner*—Christopher Ellis
*Assistant Examiner*—John D Walters
(74) *Attorney, Agent, or Firm*—Baker Bott L.L.P.

(57) ABSTRACT

An electrical energy system (1) in a hybrid car comprises an electrical motor (3), a capacitor (4) and a battery (5). The capacitor (4) is connected electrically to the electrical motor (3) and the capacitor (4) is switched in parallel with the battery (5) and the capacitor (4) has a rated voltage greater than 60V and the battery (5) has a rated voltage of less than 60V.

20 Claims, 2 Drawing Sheets

ELECTRICAL ENERGY SYSTEM IN A HYBRID CAR

CROSS-REFERENCE TO RELATED APPLICATION

This application claims priority from German Patent Application No. 10 2004 023 619.4, which was filed on May 10, 2004, and is incorporated herein by reference in its entirety.

TECHNICAL FIELD

The invention concerns an electrical energy system in a hybrid car.

BACKGROUND

Hybrid cars combine two power trains that provide power in different ways for the propulsion of the vehicle. The properties of a combustion engine and an electrical motor are a particularly good fit, which is the reason why most of the hybrid cars today have such a combination. Today, parallel hybrid concepts in which the vehicle is propelled both by the combustion engine and the electrical motor are given preference over the serial hybrid concepts in which propulsion is provided basically by the electrical motor while the combustion engine generates the electrical current for loading the energy stores or directly for driving the electrical motor.

With the parallel hybrid concept there is the possibility to use at any given time, depending on the various operating states of the vehicle, the drive system that has the better efficiency at the given speed/power range. The electrical motor may be connected to the motor crankshaft in a variety of ways. For example, it may be connected via a clutch or directly to the crankshaft of the motor or may be coupled via a belt drive or gear.

The operation via the electrical motor may be limited for example to the range where little power is required and where a combustion engine is not very efficient, while higher power requirements are used to reload the electrical energy stores (which drive the electrical motor) via the combustion engine that is relatively efficient at that stage, plus via the dynamic operation of the electrical motor. In addition the combustion engine and the electrical motor may also impart motion in parallel, for example in order to increase the maximum torque of the entire power train.

Ideally the energy needed for propelling the vehicle at low speeds and low power requirements is gained from prior recuperation processes, i.e. energy recovery from the braking phases in which the required braking force of the vehicle is at least partially generated via the dynamic operation of the electrical motor in order to reload the energy stores. Because of road resistance, losses in the vehicle drive shaft and the loss-prone energy conversion chain mechanical→electrical/electrical→mechanical, when the charged energy stores are in balance only a portion of the total propulsion force can be provided over a given driving cycle by using the energy recovered in the braking processes. For these reasons alone it makes sense to use the recovered energy preferably only for the electrical motor propulsion during the operating phases, in which the combustion engine is not very efficient.

On the other hand, if the electrical motor and the combustion engine cannot be decoupled mechanically it is from an energy standpoint not advantageous to use only an electrical drive because the drag of the motor still has to be overcome, which would noticeably impair the overall efficiency of the power train. In such a case often a combined combustion engine/electrical drive is implemented, preferably with the electrical motor kicking in during operating phases with higher power requirements so that the combustion engine can continue to work in the relatively efficient ranges. However, since the energy recovered in the braking phases turns out to be in this case less because of the additional braking effect of the motor drag, less energy is available from these phases for propulsion by the electrical motor.

When designing a total system that is optimized for fuel consumption it is therefore above all necessary for the electrical motor to be able to yield, at least short-term and in dynamic operation, high electrical energy for the brake-energy recovery during braking phases. For this reason the maximum dynamic energy is a decisive criterion for the system design.

For completeness sake it should also be said that other requirements such as the cold-start capability of the combustion engine or the torque requirement for the boost operation in the range near full power must also be taken into consideration when designing the motor. However, when it comes to optimizing the overall system for the most efficient fuel consumption possible, these are initially relegated to the background. At the same time one must make sure that the electrical energy stores are able to absorb and give off the respective electrical power for the dynamic and mechanical operation.

Normally cycle-resistant batteries are used as electrical energy stores in hybrid cars. They have the advantage of relatively high volume and mass-related energy density, but they are limited in terms of the energy input and output that can be achieved. Furthermore, the life of the battery is limited by the energy throughput (i.e. absorbed and emitted energy), with the result that heavy cycling reduces the life of the battery.

Alternatively it may make sense to use other energy storage types for the energy storage system in a hybrid car. For example it is conceivable to use, instead of a battery, a capacitor store which can be stressed cyclically almost without limitation (i.e. with substantially higher cycle numbers than for batteries). So-called double-layer capacitors are preferred for use in hybrid concepts. Several of these capacitor stores must be switched in parallel in order to obtain sufficient capacity for the electrical power train at a specified voltage.

The disadvantage of a capacitor store versus a battery is above all the noticeably lower storable energy relative to volume (energy density). This means that a capacitor store may be able to provide only a relatively small energy amount in case of stress because of the limited space available in the vehicle.

The parallel use of a battery and a capacitor store combines the advantages of both energy storage systems with the result that the capacitor store handles most of the cyclical energy input and output processes and that battery use kicks in only during the rare and long-lasting electrical stress phases.

If the energy store is designed in the form of a capacitor store with switchable battery, whereby both stores can be switched in parallel at least for voltages that are below or equal to the rated voltage of the battery, most of the cyclical energy input and output processes can run via the capacitor store while the battery essentially guarantees that the combustion engine can be started when the capacitor store is empty and takes over the power network energy supply and the supply to the electrical motor in case of mechanical operation. Since the battery is only minimally cycled in this combination, a simple and inexpensive battery technology can be used, especially a battery technology based on plumbic acid technology. Alternatively a substantially smaller cycle-resistant battery on the basis of nickel metal hybrids or lithium ions may be used in parallel.

One must always also take into consideration the necessary electrical output when designing the electrical energy system of a hybrid car. At a given voltage the power must increase proportionately in case of a higher output, which in turn affects the design of the output electronics of the electrical motor and the cable profiles. One solution is to use higher voltages, reducing thereby the power and thus the output profile. Less power is also of advantage for the life of the battery. At higher voltages the electrical motor also shows a more favorable moment curve (high moment at higher speeds). However, this advantage is reduced at voltages above 60V by the measures required to protect from electric shock. This is why the voltage profile of a hybrid car represents an output-dependent compromise. Normally outputs up to about 4 kW are operated on a 12 V basis, outputs up to about 10 kW on a 48 to 60 V basis and outputs beyond 10 kW at voltages exceeding 60V.

SUMMARY

Based on this state of the art the invention tries to solve the technical problem of improving the electrical energy system in a hybrid car.

The solution to the technical problem can be achieved by an electrical energy system in a hybrid car, comprising an electrical motor, a capacitor and a battery, wherein the capacitor is connected electrically to the electrical motor and the capacitor can be switched in parallel with the battery via at least one switch, and wherein the capacitor has a rated voltage greater than 60V and the battery has a rated voltage of less than 60V.

The capacitor may be located next to the electrical motor. The rated voltage of the battery can be between 32 and 58 V and the rated voltage of the capacitor can be between 65 and 115V. The rated voltage of the battery can also be in particular 36V or 48 V and the rated voltage of the capacitor can be 72V or 96V. The energy content of the battery may be between 600 and 2200 VAh per ton vehicle deadweight and the energy content of the capacitor may be between 10 and 80 VAh per ton vehicle deadweight. The electrical motor may have a total output of about 7-25 kW. The electrical motor can be designed as a crankshaft starter generator. The ratio between useful capacitor store energy content and electrical motor output can be between 5 and 25 kJ/kW. The ratio between battery energy content and output of the electrical motor may be below 900 kJ/kW.

For this purpose the capacitor is design with a rated voltage greater than 60V and the battery with a rated voltage of less than 60V. The effect is that all advantages of a higher voltage are achieved with regard to the electric motor, with the required protection against electric shock being limited to the electrical motor-capacitor portion, while this expense is not necessary with regard to the battery. However, the battery may be installed in the vehicle also farther away from the capacitor and the electrical motor, for example in the rear of the car. This is very desirable in terms of space because the wires to be laid through the vehicle do not fall under the regulations of protection from electric shock for voltages beyond 60V if the switch is located on the capacitor.

In a preferred embodiment the capacitor is located as close as possible to the electrical motor in order to keep the length of the wires with protection from electric shock to a minimum. However, in the process one must also keep in mind that a close location might be of disadvantage for thermal reasons. The distance between capacitor and electrical motor is preferably less than 1,000 mm.

In a preferred embodiment the battery is designed using plumbic-acid technology, preferably a design in the fleece and gel technique.

In another preferred embodiment the rated voltage of the battery is between 32 and 58V and the rated voltage of the capacitor between 65 and 115V. Also, the rated voltage of the capacitor is preferably twice the rated voltage of the battery, and the rated voltages are preferably whole-number multiples of 6V and 12V. In another preferred embodiment the rated voltage of the battery is 36V or 48V and the rated voltage of the capacitor is 72V or 96V.

In another preferred embodiment the energy content of the battery lies between 600 and 2200 VAh per ton deadweight of the vehicle and the energy content of the capacitor store is 10-80 VAh, preferably 15-70 VAh, with special preference given to 20-60 VAh per ton vehicle deadweight. The energy content of the capacitor is here related to a discharge to 0 V.

In another preferred embodiment the electrical motor has a total output of 7-25 kW, preferably 8-20 kW, with a special preference for 10-15 kW. In another preferred embodiment the ratio of the total output of the electrical motor to the deadweight of the vehicle is 4-15 kW per ton vehicle deadweight, preferably 5-13 kW per vehicle deadweight, with a special preference for 7-10 kW per ton vehicle deadweight.

The electrical motor is preferably designed as a three-phase current asynchronous motor, preferably designed with an inner rotor. In another preferred version the electrical motor is designed as crankshaft starter generator. In the process the power electronics is preferably integrated with the starter housing and has a minimal wiring length of less than 700 mm, preferably less than 400 mm, even more preferred is a length of less than 200 mm and most preferred one of less than 100 mm.

Another solution is to select a ratio between capacitor store energy content and electrical motor output ranging from 5 to 25 kJ/kW, preferably ranging from 5 to 20 kJ/kW, and even more preferred is a range from 5 to 15 kJ/kW. In the process the energy content of the capacitor store should always relate to the useful voltage lift, i.e. the limitation of the lower voltage level by the temporarily parallel switchable battery should be taken into consideration. It should be noted here that the ratio between capacitor store energy content and the output of the electrical motor can also to great advantage be combined with the selection of the voltage level of capacitor and battery according to claim 1. The indicated ratio results in an optimal absorbable recovered energy at the costs and space requirement for electrical motor and capacitor.

In another preferred embodiment the ratio between the battery energy content and the output of the electrical motor is less than 900 kJ/kW. For plumbic acid batteries the ratio is preferably below 600 kJ/kW and even more preferred is 400 kJ/kW. For nickel metal hydride and lithium ion batteries the ratio is preferably below 150 kJ/kW, preferably below 100 kJ/kW, with a special preference for less than 75 kJ/kW.

BRIEF DESCRIPTION OF THE DRAWINGS

In what follows the invention is explained in more detail using an example of embodiment. The illustrations show.

DETAILED DESCRIPTION

Figure 1:
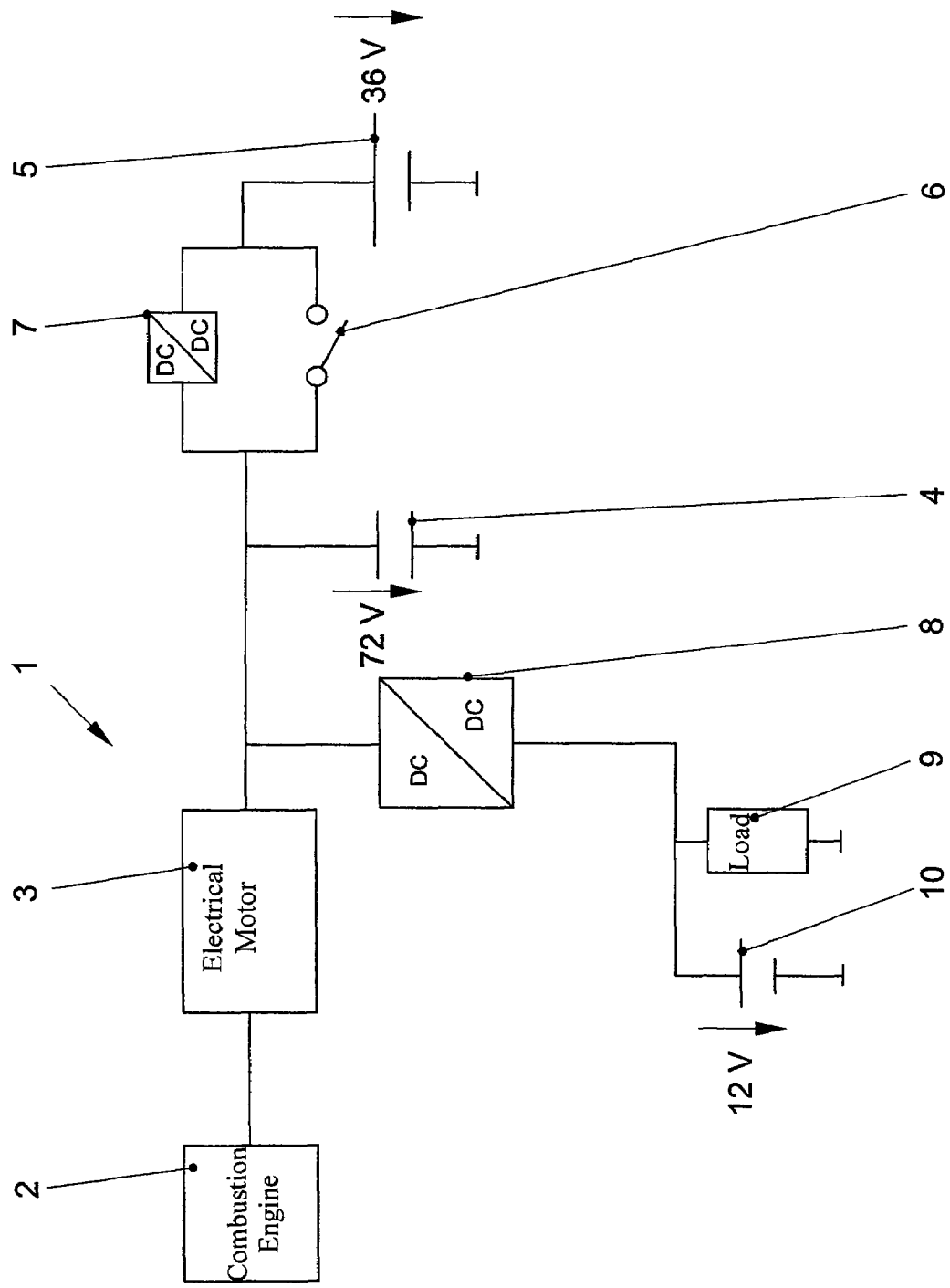
FIG. 1 a schematic diagram of an electrical energy system of a hybrid car

FIG. 1 shows the electrical energy system 1 in a hybrid car with an internal combustion engine 2. The electrical energy system 1 includes an electrical motor 3, a capacitor 4, a battery 5, a switch 6, a first DC/DC converter 7, a second DC/DC converter 8, a power supply user 9 and a power supply battery 10.

The internal combustion engine 2 is designed, by way of an example, as a direct-injection, lean-mixture diesel engine and is connected to the electrical motor 3 firmly or via a detachable clutch. The electrical motor 3 is designed for example as a crankshaft starter generator and can be operated mechanically and also dynamically. Mechanically the electrical motor 3 can start the internal combustion engine 2 and can mechanically support it (boost operation). Dynamically the electrical motor 3 can be driven by a gear, not shown, via the internal combustion engine 2 or via recovery. The rated voltage of the capacitor 4, designed preferably as a double-layer capacitor, is for example 72V. The rated voltage of the battery 5 is for example 36V, and the rated voltage of the power supply battery 10 is for example 12V. The capacitor 4 and the battery 5 can be connected to each other directly via the switch 6 as long as the voltage at the capacitor 4 is below the final charging voltage of the battery 5. At capacitor voltages above the final charging voltage the switch 6 opens, with one more charge flow from the capacitor 4 to the battery 5 being possible via the DC/DC converter 7.

Because of the high rated voltage of the capacitor 4, the electrical motor 3 can also be operated at high voltages, which is especially advantageous in the moment curve at high speed. Based on the fact that the voltage at the capacitor 4 is above 60V, the connections between the electrical motor 3 and the switch 6 or the DC/DC converters 7, 8 must be designed with a protection against electric shock. However, this is a minor expense if the capacitor 4, the switch 6 and the DC/DC converters 7,8 are located directly next to the electrical motor 3. The battery 5, on the other hand, may be mounted at some distance in the vehicle, for example, in the rear of the vehicle, which is of advantage also for reasons of space.

Since the additional components of a hybrid car such as the electrical motor and the energy stores are to some extent associated with substantially higher costs (even though conventional components such as starter and generator can be dispensed with), the overall system must be designed for an economic solution. In this connection it is above all necessary to match the maximum output of the electrical motor with the type and energy content of the electrical energy stores. This is done e.g. by looking at the relevant driving cycles.

Figure 2:
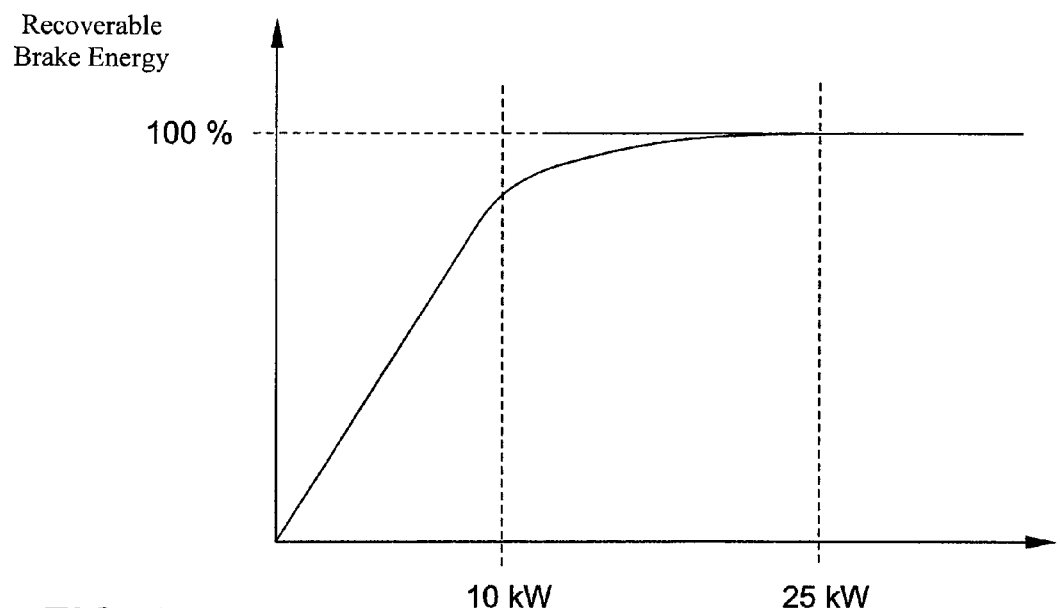
FIG. 2 an illustration of the recoverable brake energy output above the output of the electrical motor, and FIG. 3 an illustrated example of the recovery at various vehicle speeds.

FIG. 2 shows an example of a passenger car whose energy could theoretically be recovered in the braking phases as a function of the electrical motor output. The assumption in this case was a mechanically combustion engine that can be decoupled. It emerges that for example at 10 kW about 85% of the braking energy required in the braking phase could be recovered. However, an electrical motor with at least about 25 kW would be necessary for recovering 100% of the energy.

Figure 3:
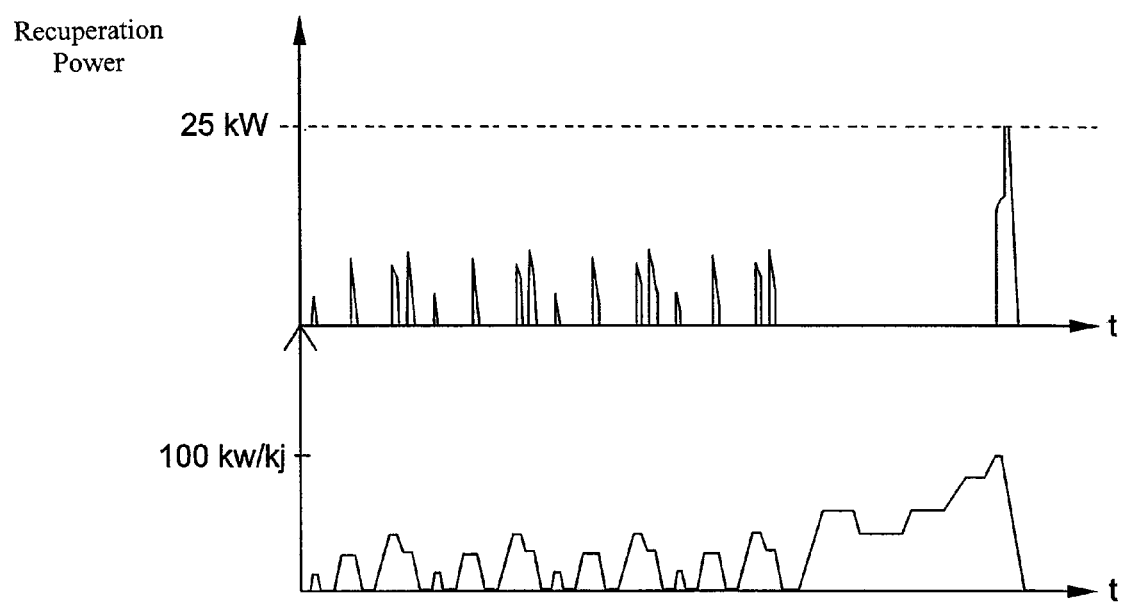

FIG. 3 shows that this is due to the fact that in inner-city traffic brake energies are <10 kW and that higher brake energies are necessary for a complete recovery only in out-of-city operation. Beyond that one must take into consideration that, depending on how the brake effect generated by the electrical motor is integrated with brake management, it happens often that the full brake energy cannot be achieved via the electrical motor but that a portion continues to be provided via the (mechanical-hydraulic) brake system of the vehicle.

In order to be able to store the energy theoretically recoverable from the last brake action in an electrical energy store, the latter would have to be able to absorb during the process energy of about 350 kJ. Based on the above-mentioned restrictions and the efficiency-related energy conversion of the electrical motor, the maximum required energy absorption in the examples shown is actually less.

In order to optimally fine-tune the electrical system consisting of electrical motor and electrical energy stores it is of advantage to select the output of the electrical motor and the energy content of the energy store in such a way that they have a certain relation to each other so as to avoid over-dimensioning (increased costs, greater space requirement).

According to the invention it is therefore suggested to use a ratio of useful capacitor store energy content/electrical motor output of 5 to 25 kJ/kW for a hybrid concept, preferably 5-20 kJ/kW, and with special preference given to 5-15 kJ/kW. In the process the energy content of the capacitor store should always relate to the useful voltage lift, thus consideration should be given to limiting the lower voltage level by a temporarily parallel switchable battery.

The ratio battery energy content/electrical motor output is designed to be below 900 kJH/kW for plumbic acid battery technologies, preferably below 600 kJ/kW, with special preference for less than 400 kJ/kW, and for lithium ion battery technologies below 150 kJ/kW, preferably below 100 kJ/kW, with special preference given to less than 75 kJ/kW.

What is claimed:

1. An electrical energy system for use in a hybrid car, said system comprising:
   an electrical motor;
   a capacitor having a rated voltage greater than 60V;
   a battery having a rated voltage of less than 60V, and
   a DC-DC converter coupled between the capacitor and the battery wherein the capacitor is in electrical communication with the electrical motor and the capacitor can be switched in parallel with the battery via at least one switch thereby bypassing said DC-DC converter.

2. An electrical energy system according to claim 1, wherein the capacitor is located next to the electrical motor.

3. An electrical energy system according to claim 1, wherein the rated voltage of the battery is between 32 and 58 V and the rated voltage of the capacitor is between 65 and 115V.

4. An electrical energy system according to claim 3, wherein the rated voltage of the battery is 36V or 48 V and the rated voltage of the capacitor is 72V or 96V.

5. An electrical energy system according to claim 1, wherein the energy content of the battery is between 600 and 2200 VAh per ton vehicle deadweight and the energy content of the capacitor is between 10 and 80 VAh per ton vehicle deadweight.

6. An electrical energy system according to claim 1, wherein the electrical motor has a total output of about 7-25 kW.

7. An electrical energy system according to claim 1, wherein the electrical motor is a crankshaft starter generator.

8. An electrical energy system according to claim 1, wherein the ratio between useful capacitor store energy content and electrical motor output is between 5 and 25 kJ/kW.

9. An electrical energy system according to claim 1, wherein the ratio between battery energy content and output of the electrical motor is below 900 kJ/kW.

10. An electrical energy system for use in a hybrid car, said system comprising:
- an electrical motor;
- a capacitor, said capacitor having a rated voltage greater than 60V and an energy content between 10 and 80 VAh per ton vehicle deadweight;
- a battery, said battery having a rated voltage of less than 60V and an energy content between 600 and 2200 VAh per ton vehicle deadweight, wherein the capacitor is in electrical communication with the electrical motor and located next to the electrical motor, and
- a DC-DC converter between the capacitor and the battery, wherein the capacitor can be switched in parallel with the battery via at least one switch thereby bypassing said DC-DC converter.

11. An electrical energy system according to claim 10, wherein the rated voltage of the battery is between 32 and 58 V and the rated voltage of the capacitor is between 65 and 115V.

12. An electrical energy system according to claim 11, wherein the rated voltage of the battery is 36V or 48V and the rated voltage of the capacitor is 72V or 96V.

13. An electrical energy system according to claim 10, wherein the electrical motor has a total output of about 7-25 kW.

14. An electrical energy system according to claim 10, wherein the electrical motor is designed as a crankshaft starter generator.

15. An electrical energy system according to claim 10, wherein the ratio between useful capacitor store energy content and electrical motor output is between 5 and 25 kJ/kW.

16. An electrical energy system according to claim 10, wherein the ratio between battery energy content and output of the electrical motor is below 900 kJ/kW.

17. An electrical energy system for use in a hybrid car, said system comprising:
- an electrical motor;
- a capacitor having a rated voltage between 65 and 115V;
- a battery having a rated voltage between 32 and 58V, and
- a DC-DC converter coupled between the capacitor and the battery wherein the capacitor is in electrical communication with the electrical motor and the capacitor can be switched in parallel with the battery via at least one switch thereby bypassing said DC-DC converter.

18. An electrical energy system according to claim 17, wherein the capacitor is located next to the electrical motor.

19. An electrical energy system according to claim 17, wherein the rated voltage of the battery is 36V or 48V and the rated voltage of the capacitor is 72V or 96V.

20. An electrical energy system according to claim 17, wherein energy content of the battery is between 600 and 2200 VAh per ton vehicle deadweight and energy content of the capacitor is between 10 and 80 VAh per ton vehicle deadweight.

* * * * *